United States Patent
Saiki et al.

(10) Patent No.: US 10,683,007 B2
(45) Date of Patent: Jun. 16, 2020

(54) COLLISION AVOIDANCE SUPPORT DEVICE

(71) Applicant: TOYOTA JIDOSHA KABUSHIKI KAISHA, Toyota-shi, Aichi (JP)

(72) Inventors: Kotaro Saiki, Susono (JP); Motoki Nishimura, Susono (JP); Kohei Morotomi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 15/791,725

(22) Filed: Oct. 24, 2017

(65) Prior Publication Data

US 2018/0178782 A1 Jun. 28, 2018

(30) Foreign Application Priority Data

Dec. 22, 2016 (JP) .................................. 2016-249131

(51) Int. Cl.
 *B60W 30/09* (2012.01)
 *G08G 1/16* (2006.01)
 (Continued)

(52) U.S. Cl.
 CPC .......... *B60W 30/09* (2013.01); *B60W 10/184* (2013.01); *B60W 10/20* (2013.01);
 (Continued)

(58) Field of Classification Search
 CPC .... B60W 30/09; B60W 10/20; B60W 10/184; B60W 2554/00; B60W 2050/143;
 (Continued)

(56) References Cited

U.S. PATENT DOCUMENTS

2007/0112516 A1  5/2007 Taniguchi
2008/0167781 A1*  7/2008 Labuhn ................. B60W 30/08
                                                 701/48
(Continued)

FOREIGN PATENT DOCUMENTS

JP       2007-137116 A     6/2007
JP       2016-001498 A     1/2016
JP       2017-043262 A     3/2017

*Primary Examiner* — Rachid Bendidi
*Assistant Examiner* — Ashley L Redhead, Jr.
(74) *Attorney, Agent, or Firm* — Oliff PLC

(57) ABSTRACT

Provided is a collision avoidance support device capable of terminating traveling direction automatic control at a timing appropriate for a driver. A traveling direction automatic control unit is configured to: terminate the traveling direction automatic control when a predetermined control termination condition is satisfied at a time before an operation start time at which a vehicle starts changing a traveling direction by the traveling direction automatic control; continue the traveling direction automatic control until an appropriate driving operation enabled time at which a predetermined required reaction time passes since a time at which an alert unit starts issuing an alert, when the predetermined control termination condition is satisfied at a time after the operation start time and before the appropriate driving operation enabled time; and terminate the traveling direction automatic control when the predetermined control termination condition is satisfied after the appropriate driving operation enabled time.

3 Claims, 11 Drawing Sheets

(51) Int. Cl.
*B60W 10/184* (2012.01)
*B60W 10/20* (2006.01)
*B60W 50/14* (2020.01)

(52) U.S. Cl.
CPC ............... *G08G 1/16* (2013.01); *G08G 1/165* (2013.01); *G08G 1/166* (2013.01); *B60W 2050/143* (2013.01); *B60W 2554/00* (2020.02); *B60W 2710/18* (2013.01); *B60W 2710/207* (2013.01)

(58) Field of Classification Search
CPC ....... B60W 2710/18; B60W 2710/207; B60W 50/14; G08G 1/166; G08G 1/165; G08G 1/16

See application file for complete search history.

(56) References Cited

U.S. PATENT DOCUMENTS

2016/0280266 A1* 9/2016 Kawamata .......... B60W 10/184
2017/0057498 A1  3/2017 Katoh
2017/0291602 A1* 10/2017 Newman ............... B60W 50/16

* cited by examiner

COLLISION AVOIDANCE SUPPORT DEVICE

BACKGROUND OF THE INVENTION

1. Field of the Invention

The present invention relates to a collision avoidance support device, which is configured to support a driver so that a vehicle avoids collision with an obstacle.

2. Description of the Related Art

Hitherto, there has been known a vehicle including a collision avoidance support device (for example, Japanese Patent Application Laid-open No. 2007-137116).

The collision avoidance support device causes a buzzer to beep when, for example, an obstacle with which the vehicle is highly likely to collide is detected by a camera or/and a radar sensor.

Further, for example, when the collision avoidance support device determines that the vehicle is highly likely to collide with the obstacle in a case where a driver does not step on the brake pedal even after the buzzer beeps, the collision avoidance support device executes automatic brake control of applying braking forces to wheels of the vehicle.

Further, when the collision avoidance support device determines that the vehicle is highly likely to collide with the obstacle even after the automatic brake control is executed, the collision avoidance support device executes automatic steering control (traveling direction automatic control) of changing steering angles of steered wheels of the vehicle so that the vehicle avoids collision with the obstacle.

When the collision avoidance support device terminates the automatic steering control after a predetermined control termination condition is satisfied during the execution of the automatic steering control, a subsequent steering operation of the steered wheels is left to the driver.

However, when the buzzer beeps, the driver executes two steps including a step of recognizing a beeping sound of the buzzer and a step of determining an operation to be executed in order to avoid collision of the vehicle and the obstacle, and then executes a steering operation required for avoiding the collision. In other words, the driver may fail to execute an appropriate steering operation until a predetermined period of time passes since the buzzer starts beeping. The predetermined period of time is hereinafter referred to as "required reaction time".

Accordingly, when the collision avoidance support device terminates the automatic steering control during the required reaction time, the following problem may occur.

Specifically, for example, in a case where a traveling direction of the vehicle is greatly inclined with respect to an extending direction of a road at a time when the collision avoidance support device terminates the automatic steering control, the driver needs to immediately execute an appropriate steering operation to make the traveling direction of the vehicle in (substantially) parallel to the extending direction of the road.

However, the driver may fail to execute an appropriate steering operation during the required reaction time.

Thus, when the collision avoidance support device terminates the automatic steering control before a termination time of the required reaction time, for example, the vehicle may travel in a direction greatly inclined with respect to the extending direction of the road between the termination time of the automatic steering control and the termination time of the required reaction time.

SUMMARY OF THE INVENTION

The present invention has been made in order to solve the above-mentioned problem. Specifically, it is an object of the present invention to provide a collision avoidance support device capable of terminating traveling direction automatic control at a timing appropriate for a driver.

In order to achieve the above-mentioned object, according to one embodiment of the present invention, there is provided a collision avoidance support device including:

obstacle detection means (34) for detecting an obstacle (80) existing in front of a vehicle (10);

alert means (20, 21) for issuing an alert to a driver of the vehicle when the vehicle is highly likely to collide with the obstacle;

automatic brake control means (22, 40) for executing automatic brake control of applying braking forces to wheels (16FW, 16RW) of the vehicle when the vehicle is highly likely to collide with the obstacle under a state in which the alert means is issuing the alert; and traveling direction automatic control means (18, 50) for executing traveling direction automatic control of changing a traveling direction of the vehicle so that the vehicle avoids collision with the obstacle when the vehicle is highly likely to collide with the obstacle under a state in which the automatic brake control means is executing the automatic brake control.

The traveling direction automatic control means is configured to:

terminate the traveling direction automatic control when a predetermined control termination condition is satisfied at a time before an operation start time (t3) at which the vehicle starts changing the traveling direction by the traveling direction automatic control;

continue the traveling direction automatic control until an appropriate driving operation enabled time (t4) at which a predetermined required reaction time (Tnr) passes since a time (t0) at which the alert means starts issuing the alert, when the predetermined control termination condition is satisfied at a time after the operation start time (t3) and before the appropriate driving operation enabled time; and terminate the traveling direction automatic control when the predetermined control termination condition is satisfied after the appropriate driving operation enabled time.

The required reaction time is a period of time required until a driver having an average driving capability starts an appropriate driving operation (i.e., a driving operation required for avoiding collision with the obstacle) after recognizing the start of the alert by the alert means.

The traveling direction automatic control means of the one embodiment of the present invention is configured to terminate the traveling direction automatic control when the predetermined control termination condition is satisfied at the time before the operation start time at which the vehicle starts changing the traveling direction by the traveling direction automatic control. In other words, when the predetermined control termination condition is satisfied under a state in which the traveling direction of the vehicle is not changed by the traveling direction automatic control independently of the driver's intention, the traveling direction automatic control means immediately terminates the traveling direction automatic control.

In this case, the traveling direction of the vehicle is not changed independently of the driver's intention, and hence the driver is highly likely to be able to execute an appropriate driving operation (e.g., a steering operation) immediately after the traveling direction automatic control means terminates the traveling direction automatic control.

Further, the traveling direction automatic control means is configured to continue the traveling direction automatic control until the appropriate driving operation enabled time at which the predetermined required reaction time passes since the time at which the alert means starts issuing the alert, when the predetermined control termination condition is satisfied at the time after the operation start time and before the appropriate driving operation enabled time.

Further, the traveling direction automatic control means is configured to terminate the traveling direction automatic control when the predetermined control termination condition is satisfied after the appropriate driving operation enabled time.

Thus, the behavior of the vehicle is less likely to become unstable as a result of a driver's inappropriate driving operation executed at the time before the appropriate driving operation enabled time.

In addition, even when the traveling direction automatic control means terminates the traveling direction automatic control after the appropriate driving operation enabled time, the driver can execute an appropriate steering operation after the termination of the traveling direction automatic control.

Accordingly, the timing at which the traveling direction automatic control means of the present invention terminates the traveling direction automatic control is a timing appropriate for the driver.

A feature of one embodiment of the present invention resides in that the traveling direction automatic control means is automatic steering control means for executing automatic steering control of adjusting steering angles of steered wheels (16FW), which are a part of the wheels.

In the description given above, in order to facilitate understanding of the present invention, names and/or reference symbols in parentheses used in an embodiment of the present invention described later are added to components of the invention corresponding to the embodiment. However, respective components of the present invention are not limited to the embodiment prescribed by the reference symbols. Other objects, other features, and accompanying advantages of the present invention can be readily understood from a description of the embodiment of the present invention provided referring to the accompanying drawings.

DESCRIPTION OF THE EMBODIMENTS

Now, referring to the accompanying drawings, description is given of a vehicle (automobile) 10 to which a collision avoidance support device according to an embodiment of the present invention is mounted.

Figure 1:
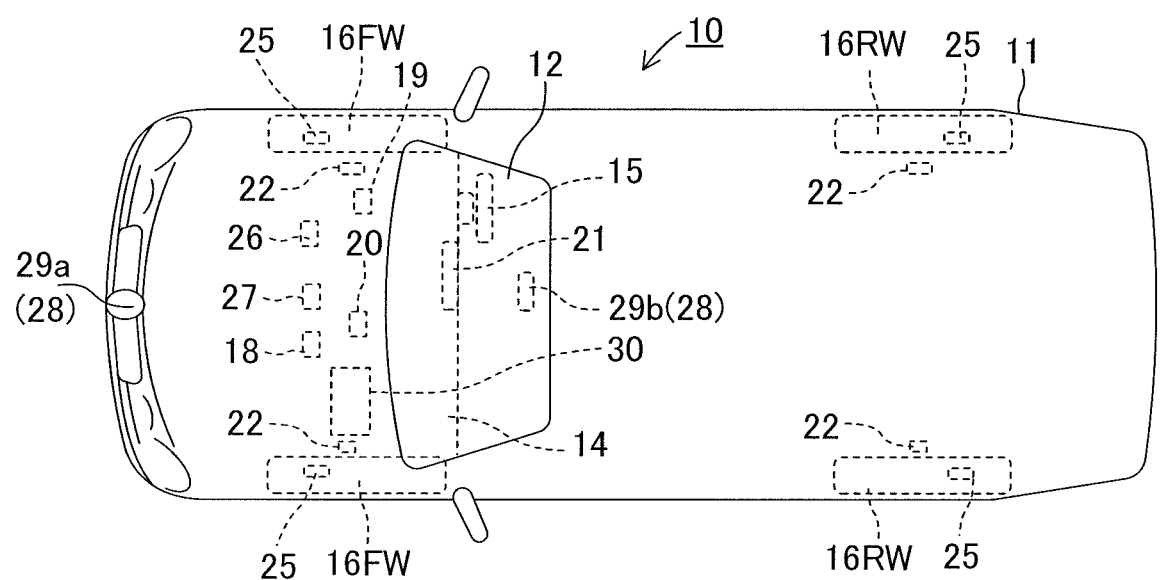
FIG. 1 is a plan view of a vehicle to which a collision avoidance support device according to an embodiment of the present invention is mounted.

As illustrated in FIG. 1, a windshield 12 formed of a transmissive material (e.g., glass or resin) is fixed to a vehicle body 11 of the vehicle 10.

A dashboard 14 is fixed to a front part of the inside of the vehicle 10. A steering wheel 15 is rotatably supported in a right-side part of the dashboard 14.

The vehicle 10 further includes a pair of left and right front wheels 16FW and a pair of left and right rear wheels 16RW. The left and right front wheels 16FW are steered wheels.

A collision avoidance support mode selection switch (not shown) is arranged on the dashboard 14.

When the collision avoidance support mode selection switch is positioned at an on position, a support ECU 30, a brake ECU 40, a steering ECU 50, and an alert ECU 60 execute collision avoidance support control (alert control, automatic brake control, and automatic steering control) described later. Meanwhile, when the collision avoidance support mode selection switch is positioned at an off position, the support ECU 30, the brake ECU 40, the steering ECU 50, and the alert ECU 60 do not execute the collision avoidance support control.

Figure 2:
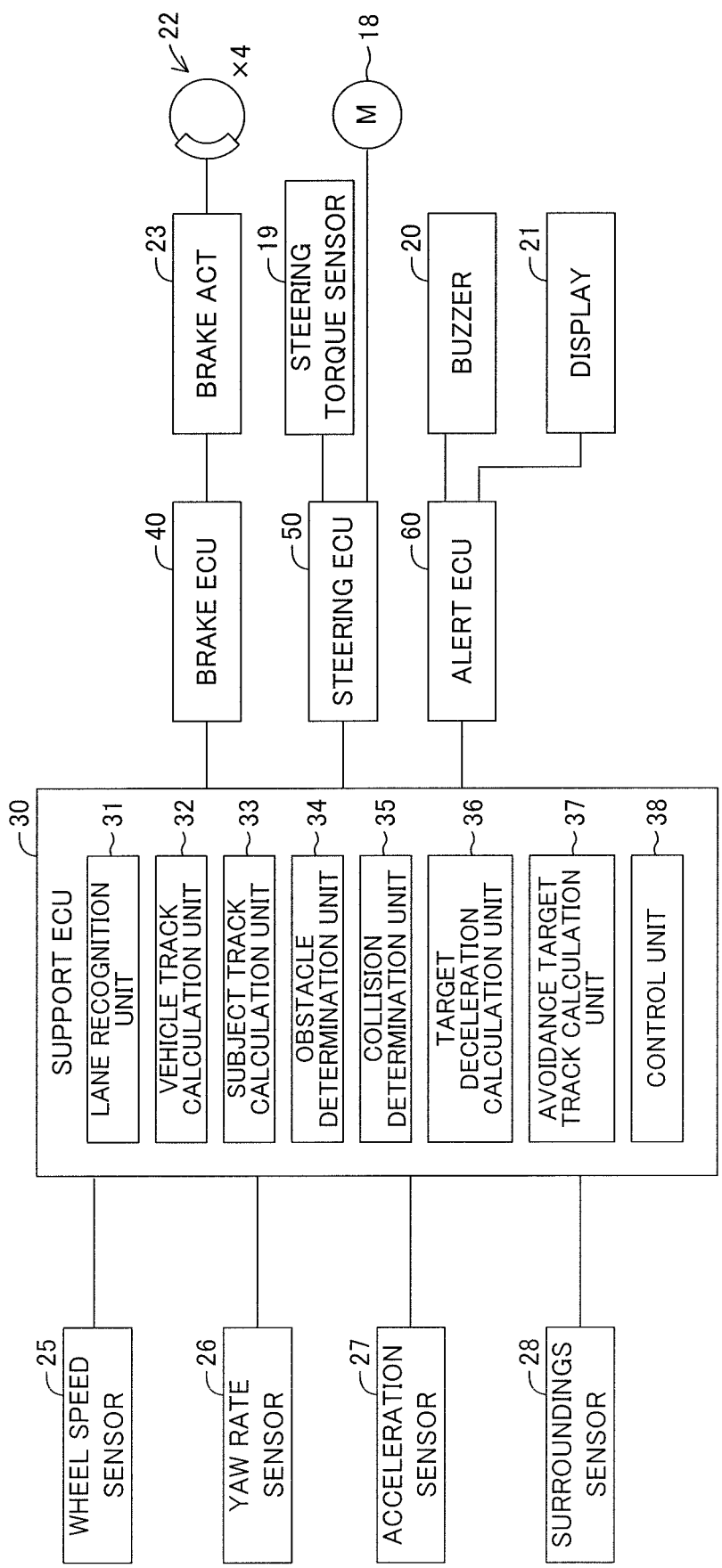
FIG. 2 is a system configuration diagram of the collision avoidance support device.

The steering wheel 15 and the left and right front wheels 16FW are connected to each other via a known electric power steering mechanism. Only a part of components of the electric power steering mechanism is illustrated in FIG. 1 and FIG. 2.

The electric power steering mechanism includes a rack shaft extending in a left-and-right direction of the vehicle and slidable in the left-and-right direction. A pair of left and right tie rods is connected to left and right ends of the rack shaft, and the left and right tie rods are connected to left and right carriers. The left and right carriers are rotatable about king pin axes with respect to the vehicle body 11. Further, the left and right carriers rotatably support the left and right front wheels 16FW about a horizontal axis, respectively. A pinion shaft meshes with a thread groove formed in the rack shaft. One end (lower end) of a steering shaft is connected to the pinion shaft via a universal joint. Further, the steering wheel 15 is fixed to the other end (upper end) of the steering shaft.

Accordingly, when the steering wheel 15 is rotated, this rotation force is transmitted to the steering shaft, the universal joint, and the pinion shaft. Then, the rack shaft meshing with the pinion shaft slides in one direction out of the left and right directions, and thus steering angles of the left and right front wheels 16FW linked to the rack shaft via the tie rods and the carriers change.

The electric power steering mechanism further includes an electric motor 18. The electric motor 18 is linked to the rack shaft via a speed reduction mechanism.

The electric power steering mechanism further includes a steering torque sensor 19 for detecting a steering torque (torsion angle) of a torsion bar, which forms a middle portion of the steering shaft.

For example, when the steering torque is generated in the steering shaft as a result of a driver's operation of the steering wheel 15 for rotation, the steering ECU 50 described later calculates a target steering assist torque based on the steering torque detected by the steering torque sensor 19. Further, the steering ECU 50 controls the electric motor 18 for rotation to cause the electric motor 18 to output a rotation force corresponding to the target steering assist torque. Then, a torque generated by the electric motor 18 is transmitted to the rack shaft, and thus the steering assist is executed.

Further, as illustrated in FIG. 1 and FIG. 2, the vehicle 10 includes a buzzer 20, a display 21, and four friction brake mechanisms 22.

The buzzer 20 is capable of beeping.

The display 21 is a liquid crystal display fixed to the dashboard 14.

Each of the friction brake mechanisms 22 is connected to a brake actuator 23. The brake actuator 23 is arranged in a hydraulic circuit, which is arranged between a master cylinder (not shown) configured to pressurize a hydraulic fluid when a brake pedal is stepped on and each of the friction brake mechanisms 22. When the brake pedal is stepped on, the hydraulic fluid pressurized by the master cylinder is supplied from the brake actuator 23 to the friction brake mechanisms 22, to thereby apply braking forces to the front wheels 16FW and the rear wheels 16RW by the respective friction brake mechanisms 22.

The vehicle 10 further includes wheel speed sensors 25, a yaw rate sensor 26, and an acceleration sensor 27.

The wheel speed sensors 25 are arranged so as to correspond to the respective front wheels 16FW and rear wheels 16RW. Each of the wheel speed sensors 25 is configured to detect a wheel speed of a corresponding one of the front wheels 16FW and the rear wheels 16RW.

The yaw rate sensor 26 is configured to detect a yaw rate of the vehicle 10.

The acceleration sensor 27 is configured to detect a longitudinal acceleration acting in a front-and-rear direction of the vehicle 10 and a lateral acceleration acting in the left-and-right direction (vehicle width direction) of the vehicle 10.

The vehicle 10 further includes a surroundings sensor 28. The surroundings sensor 28 includes a radar sensor 29a and a camera 29b.

The radar sensor 29a fixed to a front end of the vehicle body 11 is configured to radiate a millimeter radio wave around (including at least a front side of) the vehicle 10. When the radio wave radiated by the radar sensor 29a is reflected by, for example, a reflector (e.g., a pedestrian) positioned around the vehicle 10, the radar sensor 29a receives the reflected wave. Then, calculation means built in the radar sensor 29a calculates, based on radiation and reception timings of the radio wave, presence or absence of the reflector and a relative relationship between the vehicle 10 and the reflector (e.g., the distance between the vehicle 10 and the reflector and a relative speed between the vehicle 10 and the reflector).

The camera 29b is arranged inside the vehicle 10 so as to be positioned immediately behind the windshield 12, and is formed using a stereo camera.

The camera 29b is configured to image a subject (e.g., a pedestrian) positioned in front of the windshield 12.

Calculation means built in the camera 29b identifies a type of the subject contained in imaged data acquired by the camera 29b through pattern matching that uses the imaged data.

A subject may be a moving object or a stationary object. Examples of the moving object include a pedestrian, a bicycle, and a vehicle (automobile). Examples of the stationary object include a sign board, a utility pole, a tree, and a guard rail.

As described later, based on a change in position of the subject detected from the imaged data, it can be determined which of the moving object and the stationary object the subject is.

The camera 29b is also capable of imaging (recognizing) left and right white lines (lane markers) of a road. The calculation means built in the camera 29b calculates the shape of the road and a positional relationship between the road and the vehicle 10. The calculation means of the camera 29b calculates a positional relationship between the road and the subject. In other words, the calculation means of the camera 29b recognizes whether or not the subject is positioned between left and right white lines of a travel lane of the road.

Information acquired in this manner by the surroundings sensor 28 is herein referred to as "target information".

As illustrated in FIG. 2, the collision avoidance support device according to this embodiment includes the support ECU 30, the brake ECU 40, the steering ECU 50, and the alert ECU 60.

The respective ECUs 30, 40, 50, and 60 include microcomputers as main components, and are mutually connected to one another via a controlled area network (CAN) (not shown) for reception and transmission of various types of control information and request signals. "ECU" is an abbreviation of electric control unit. The microcomputer herein includes a CPU and storage devices (e.g., a ROM and a RAM), and the CPU is configured to implement various functions by executing instructions (programs) stored in the ROM.

The support ECU 30 is connected to the wheel speed sensors 25, the yaw rate sensor 26, the acceleration sensor 27, and the surroundings sensor 28.

The wheel speed sensors 25, the yaw rate sensor 26, the acceleration sensor 27, and the surroundings sensor 28 are configured to repeatedly transmit their detection results to the support ECU 30 at predetermined cycles (intervals).

As described later, the support ECU 30 determines, based on the imaged data transmitted from the surroundings sensor 28, whether or not the vehicle 10 is highly likely to collide with the subject (obstacle), which is a target within the imaged data. Then, when it is determined that "the vehicle 10 is highly likely to collide with the subject", the support ECU 30 controls the brake ECU 40, the steering ECU 50, and the alert ECU 60. A specific method of controlling the brake ECU 40, the steering ECU 50, and the alert ECU 60 by the support ECU 30 is described later.

The brake ECU 40 is connected to the brake actuator 23.

Thus, even in a case where the brake pedal is not stepped on, when the brake actuator 23 receives an operation signal from the brake ECU 40, the brake actuator 23 supplies the hydraulic fluid to each of the friction brake mechanisms 22. Accordingly, also in this case, each of the friction brake mechanisms 22 applies braking forces to the corresponding front wheels 16FW and the corresponding rear wheels 16RW.

The steering ECU 50 is a device configured to control the electric power steering mechanism, and is connected to the electric motor 18 and the steering torque sensor 19.

As described above, when the driver operates the steering wheel 15 for rotation, the steering ECU 50 controls the electric motor 18 for rotation to execute a steering assist.

Further, in a case where the driver does not operate the steering wheel 15 for rotation, when the steering ECU 50 receives an operation signal for collision avoidance transmitted from the support ECU 30, the steering ECU 50 controls the electric motor 18 for rotation in accordance with the operation signal to steer the front wheels 16FW.

The alert ECU 60 is connected to the buzzer 20 and the display 21.

When the vehicle 10 is highly likely to collide with the subject, the alert ECU 60 operates in accordance with an operation signal transmitted from the support ECU 30. Specifically, the alert ECU 60 causes the buzzer 20 to beep to alert the driver to the possibility of collision, and causes the display 21 to display an operation state of the collision avoidance support control.

Next, functions of the support ECU 30 are described.

From the functional viewpoint of the support ECU 30, the support ECU 30 includes a lane recognition unit 31, a vehicle track calculation unit 32, a subject track calculation unit 33, an obstacle determination unit 34, a collision determination unit 35, a target deceleration calculation unit 36, an avoidance target track calculation unit 37, and a control unit 38.

The lane recognition unit 31 is configured to generate information on a road on which the vehicle 10 travels based on the target information transmitted from the surroundings sensor 28. For example, the lane recognition unit 31 uses a two-dimensional coordinate system having an origin at a center of the front end of the vehicle 10 and extending in the left and right directions and the front direction from the origin to generate coordinate information (positional information) on each of ground, the subject, and the left and right white lines of the road. In this manner, the lane recognition unit 31 recognizes the shape of the travel lane of the vehicle 10 defined by the left and right white lines, the position and direction of the vehicle 10 within the travel lane, and relative positions of the ground and the subject (reflector, which may be an obstacle) with respect to the vehicle 10. The lane recognition unit 31 updates the coordinate information every time the lane recognition unit 31 receives the target information transmitted from the surroundings sensor 28.

The vehicle track calculation unit 32 is configured to calculate a turning radius of the vehicle 10 based on the yaw rate detected by the yaw rate sensor 26 and a vehicle speed, which is calculated through use of the wheel speeds detected by the wheel speed sensors 25. The vehicle track calculation unit 32 is further configured to calculate a track of the vehicle 10 based on the calculated turning radius. The track of the vehicle 10 is a change in position of the vehicle 10 during a period of time from a current time until a predetermined period of time passes, and has a predetermined width orthogonal in plan view to a traveling direction of the vehicle 10. The track of the vehicle 10 calculated in this manner is hereinafter referred to as "predicted vehicle track".

The subject track calculation unit 33 is configured to determine, based on information on a change in position of the subject acquired from the imaged data, which of the moving object and the stationary object the subject is. In other words, the subject track calculation unit 33 determines the type of the subject.

Specifically, when the camera 29b identifies the type of the subject within the imaged data through pattern matching, the camera 29b assigns an individual ID (identification information) to each subject. Then, the subject track calculation unit 33 uses the ID to identify each subject within the imaged data, and determines whether or not each subject has changed its position within a predetermined period of time. For example, when a given subject has changed its position within the predetermined period of time, the subject track calculation unit 33 determines that "this subject is a moving object". Meanwhile, when a given subject has not changed its position within the predetermined period of time, the subject track calculation unit 33 determines that "this subject is a stationary object".

Further, when the subject is the moving object, the subject track calculation unit 33 calculates the track of the subject. For example, a moving speed of the subject in the front-and-rear direction (traveling direction of the vehicle 10) can be calculated based on the vehicle speed of the vehicle 10 and the relative speed between the vehicle 10 and the subject. A moving speed of the subject in the left-and-right direction can be calculated based on an amount of change in distance between a position of a side end of the subject and the white line, which is detected by the surroundings sensor 28, for example. The subject track calculation unit 33 calculates, based on the moving speeds of the subject in the front-and-rear direction and the left-and-right direction, a track of the subject, which is a change in position of the subject (target) during a period of time from the current time until a predetermined period of time passes. The track of the subject calculated in this manner is hereinafter referred to as "predicted target track". Alternatively, the subject track calculation unit 33 may calculate the predicted target track based on the calculated predicted vehicle track of the vehicle 10 and the distance between the vehicle 10 and the subject, which is detected by the surroundings sensor 28.

The obstacle determination unit 34 is configured to determine, based on the predicted vehicle track of the vehicle 10 and the predicted target track of the subject being the moving object, whether or not the vehicle 10 is likely to collide with the subject when the subject keeps a current movement state and the vehicle 10 keeps a current traveling state (that is, the speed and steering angles of the vehicle 10). In other words, the obstacle determination unit 34 determines that the vehicle 10 is likely to collide with the subject when the predicted vehicle track and the predicted target track interfere with each other.

The obstacle determination unit 34 is further configured to determine, based on the predicted vehicle track of the vehicle 10 and the position of the subject being the stationary object, whether or not the vehicle 10 is likely to collide with the subject when the subject keeps a stationary state and the vehicle 10 keeps the current traveling state. In other words, the obstacle determination unit 34 determines that the vehicle 10 is likely to collide with the subject when the predicted vehicle track of the vehicle 10 and the position of the subject interfere with each other.

When determining that the vehicle 10 is likely to collide with the subject, the obstacle determination unit 34 identifies the subject as an obstacle.

The result of determination made by the obstacle determination unit 34 as to whether or not the subject (target) is the obstacle is used for the alert control and the automatic brake control, which are described later. In other words, when the obstacle determination unit 34 determines that the subject positioned in front of the vehicle 10 is the obstacle, the alert control and the automatic brake control are executed.

The collision determination unit 35 is configured to calculate, based on a distance L between the obstacle and the vehicle 10 and a relative speed Vr of the vehicle 10 with respect to the obstacle transmitted from the surroundings sensor 28, a predicted time to collision TTC, which is a predicted period of time until the vehicle 10 collides with the obstacle, through Expression (1) given below.

$$TTC = L/Vr \quad (1)$$

When the predicted time to collision TTC is equal to or shorter than a collision determination threshold time set in advance, the collision determination unit 35 determines that the vehicle 10 is highly likely to collide with the obstacle.

In this embodiment, two types of collision determination threshold times are used. Specifically, a first collision determination threshold time TTCth1 or a second collision determination threshold time TTCth2 is used as the collision determination threshold time. The second collision determination threshold time TTCth2 is shorter than the first collision determination threshold time TTCth1.

When the predicted time to collision TTC becomes equal to or shorter than the first collision determination threshold time TTCth1 under a state in which the obstacle determination unit 34 determines that "the subject (target) positioned in front of the vehicle 10 is an obstacle", the collision determination unit 35 determines that "the vehicle 10 is highly likely to collide with the obstacle".

Then, the alert ECU 60 receives the operation signal from the support ECU 30, and causes the buzzer 20 and the display 21 to operate for a predetermined period of time. Specifically, for the predetermined period of time, the buzzer 20 beeps and the display 21 displays an operation state of the collision avoidance support control.

The target deceleration calculation unit 36 is configured to calculate a target deceleration at which the vehicle 10 is to be decelerated when the obstacle determination unit 34 determines that "the subject (target) positioned in front of the vehicle 10 is an obstacle".

For example, in a case where the obstacle is a stationary object, when the vehicle speed (=relative speed) of the vehicle 10 at the current time is represented by V, the deceleration of the vehicle 10 is represented by a, and a period of time until the vehicle 10 stops (that is, a period of time until the vehicle speed becomes zero) is represented by t, a travel distance X until the vehicle 10 stops can be expressed by Expression (2) given below.

$$X = V \cdot t + (1/2) \cdot a \cdot t^2 \quad (2)$$

The period of time t until the vehicle 10 stops can be expressed by Expression (3) given below.

$$t = -V/a \quad (3)$$

Accordingly, through substitution of Expression (3) into Expression (2), the deceleration a required for stopping the vehicle 10 when the vehicle 10 travels for a travel distance D can be expressed by Expression (4) given below.

$$a = -V^2/2D \quad (4)$$

In order to stop the vehicle 10 at a position separated by a distance β from the obstacle toward the vehicle 10, it is only necessary to set the travel distance D to a distance (L-β) obtained by subtracting the distance β from the distance L detected by the surroundings sensor 28. When the obstacle is a moving object, it is only necessary to calculate the deceleration a by using the relative speed Vr in place of the vehicle speed V.

The target deceleration calculation unit 36 sets the deceleration a calculated in this manner as the target deceleration. There is a limit value to the deceleration of the vehicle 10 (e.g., approximately −1 G). Thus, when an absolute value of the calculated target deceleration is larger than a limit value (upper limit value) set in advance, the target deceleration calculation unit 36 sets the limit value as the absolute value of the target deceleration.

When the predicted time to collision TTC becomes equal to or shorter than the second collision determination threshold time TTCth2 after the alert ECU 60 causes the buzzer 20 and the display 21 to operate, the collision determination unit 35 determines that "the vehicle 10 is highly likely to collide with the obstacle".

Then, the control unit 38 transmits to the brake ECU 40 an operation signal indicating the target deceleration calculated by the target deceleration calculation unit 36. The brake ECU 40 then controls the brake actuator 23 based on the target deceleration. The friction brake mechanisms 22 then apply friction braking forces to the front wheels 16FW and the rear wheels 16RW. In other words, the automatic brake control is executed.

The avoidance target track calculation unit 37 is configured to calculate an avoidance target track (avoidance path) through which the vehicle 10 may pass to avoid collision with the obstacle when the obstacle determination unit 34 determines that "the subject (target) positioned in front of the vehicle 10 is an obstacle".

Figure 3:
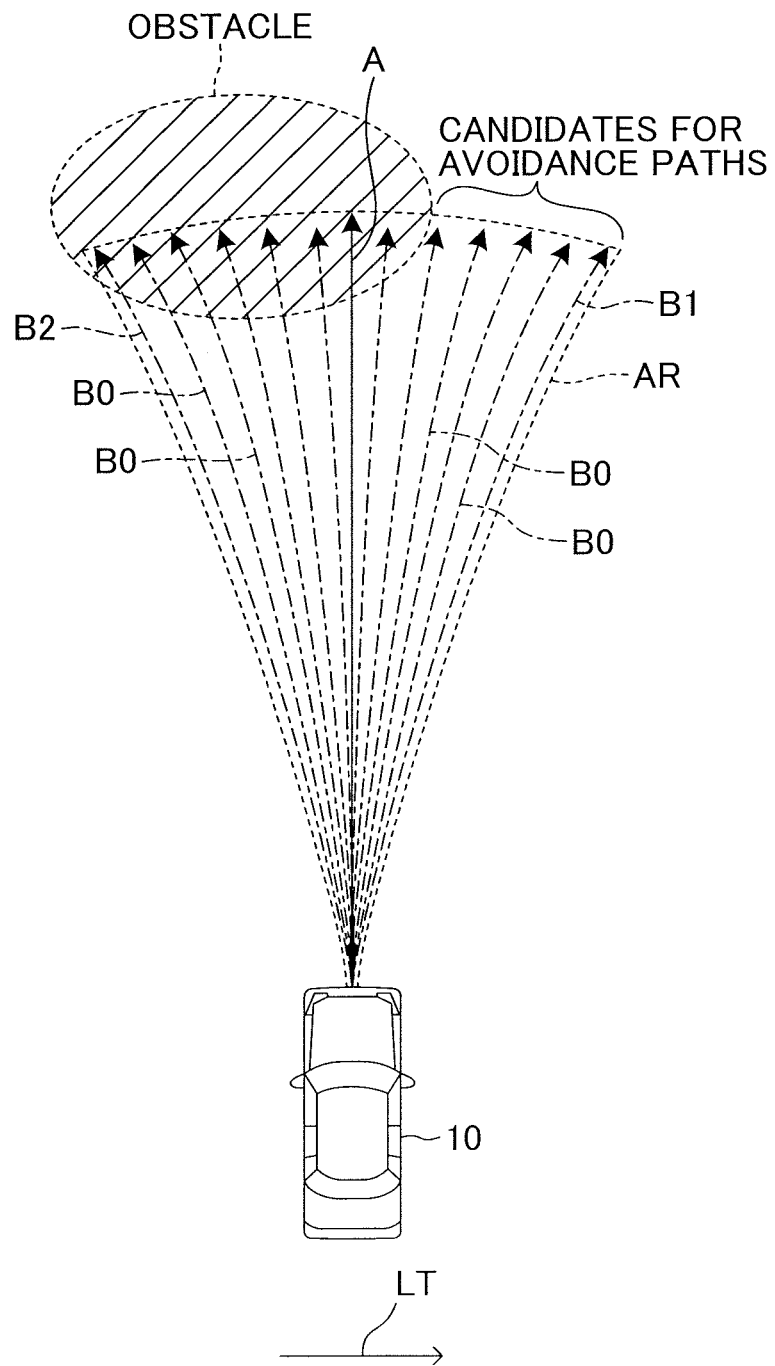
FIG. 3 is a plan view for illustrating avoidance paths of the vehicle.

For example, as illustrated in FIG. 3, the avoidance target track calculation unit 37 calculates (identifies) a path A through which the vehicle 10 passes when it is assumed that the vehicle 10 travels while keeping the current travel state. Specifically, the avoidance target track calculation unit 37 calculates the current path A based on a lateral acceleration Gy0 currently acting on the vehicle 10 in a direction of an arrow LT. Then, the avoidance target track calculation unit 37 identifies a path B1 through which the vehicle 10 is predicted to pass when a maximum change amount ΔGy of a lateral force that may act on the vehicle 10 is added to the current lateral acceleration Gy0. The maximum change amount ΔGy is a maximum value of a change amount of the lateral force that does not inhibit the vehicle 10 from safely turning at the vehicle speed at the current time. The avoidance target track calculation unit 37 further calculates (identifies) a path B2 through which the vehicle 10 is predicted to pass when the maximum change amount ΔGy is subtracted from the lateral acceleration Gy0 of the vehicle 10 at the current time.

The avoidance target track calculation unit 37 calculates a plurality of paths B0, which are each obtained by changing the lateral acceleration by a fixed amount, within a range AR of from the path B1 to the path B2 in order from, for example, the path B1 to the path B2. Specifically, the avoidance target track calculation unit 37 reduces a change amount of the lateral acceleration from the lateral acceleration corresponding to the path B1 by a fixed amount each in order, to thereby calculate the plurality of paths B0 in order from the path B1 to the path B2.

Further, the avoidance target track calculation unit 37 identifies, among the path B1, the path B2, and the paths B0, a path whose distance to the obstacle in a width direction of the road on which the vehicle 10 travels is larger than a predetermined limit value VI, as a selected avoidance path that is an avoidance path through which the vehicle 10 is to travel. For example, first, the avoidance target track calculation unit 37 compares the distance between the path B1 and the obstacle with the limit value VI. When determining that the distance is larger than the limit value VI, the avoidance target track calculation unit 37 identifies the path B1 as the selected avoidance path.

The selected avoidance path is set within a range in which the vehicle 10 does not depart from the travel lane on which the vehicle 10 is traveling and in which the ground is confirmed to be formed.

After identification of the selected avoidance path, the avoidance target track calculation unit 37 calculates a target yaw rate for causing the vehicle 10 to travel along the selected avoidance path.

The collision determination unit 35 determines whether or not "the travel distance X calculated based on an actual deceleration a and vehicle speed V at the current time is larger than a value (L0−β) obtained by subtracting β from a distance L0 from the vehicle 10 to the obstacle at the current time". Then, when the travel distance X is larger than the value (L0−β), the collision determination unit 35 determines that "the vehicle 10 is highly likely to collide with the obstacle".

The control unit 38 then calculates a target steering angle at which the target yaw rate calculated by the avoidance target track calculation unit 37 can be obtained based on the target yaw rate and the vehicle speed of the vehicle 10. The control unit 38 then transmits an operation signal indicating the target steering angle to the steering ECU 50. The steering ECU 50 then drives the electric motor 18 based on the target steering angle to steer the front wheels 16FW and the rear wheels 16RW. In other words, the control unit 38 executes the automatic steering control for causing the vehicle 10 to travel along the selected avoidance path.

In this embodiment, in principle, the automatic brake control by the brake ECU 40 and the automatic steering control by the steering ECU 50 terminate at the same time when the collision determination unit 35 determines that "a predetermined control termination condition is satisfied". In this case, the control unit 38 transmits stop signals to the brake ECU 40 and the steering ECU 50.

However, as described later, under a predetermined condition, even when the collision determination unit 35 determines that "the predetermined control termination condition is satisfied", the automatic brake control by the brake ECU 40 and the automatic steering control by the steering ECU 50 are continued without being ended.

In a case where the vehicle speed of the vehicle 10 is zero, even when the driver does not steer the steering wheel 15, the vehicle 10 is unlikely to depart from the travel lane on which the vehicle 10 is traveling to an adjacent travel lane. Accordingly, in this embodiment, the control termination condition is satisfied when the vehicle speed of the vehicle 10 becomes zero.

Further, in a case where the traveling direction of the vehicle 10 is parallel to the white lines of the travel lane on which the vehicle 10 is traveling, even when the driver does not steer the steering wheel 15, the vehicle 10 is unlikely to depart from the current travel lane to the adjacent travel lane.

Still further, when the distance in a width direction of the travel lane from the vehicle 10 to one of the left and right white lines of the travel lane on which the vehicle 10 is traveling is longer than the distance in the width direction from the vehicle 10 to the other white line, and the vehicle 10 is traveling not in parallel to the other white line while approaching the one white line, even when the driver does not steer the steering wheel 15, the vehicle 10 is unlikely to pass through the other white line to depart from the travel lane on which the vehicle 10 is traveling to the adjacent travel lane.

Accordingly, in this embodiment, the control termination condition is satisfied when the lane recognition unit 31 determines that "the traveling direction of the vehicle 10 is parallel to the white lines" or when the lane recognition unit 31 determines that "the distance in the width direction of the travel lane from the vehicle 10 to one of the left and right white lines of the travel lane on which the vehicle 10 is traveling is longer than the distance in the width direction from the vehicle 10 to the other white line, and the vehicle 10 is traveling not in parallel to the other white line while approaching the one white line".

Figure 4:
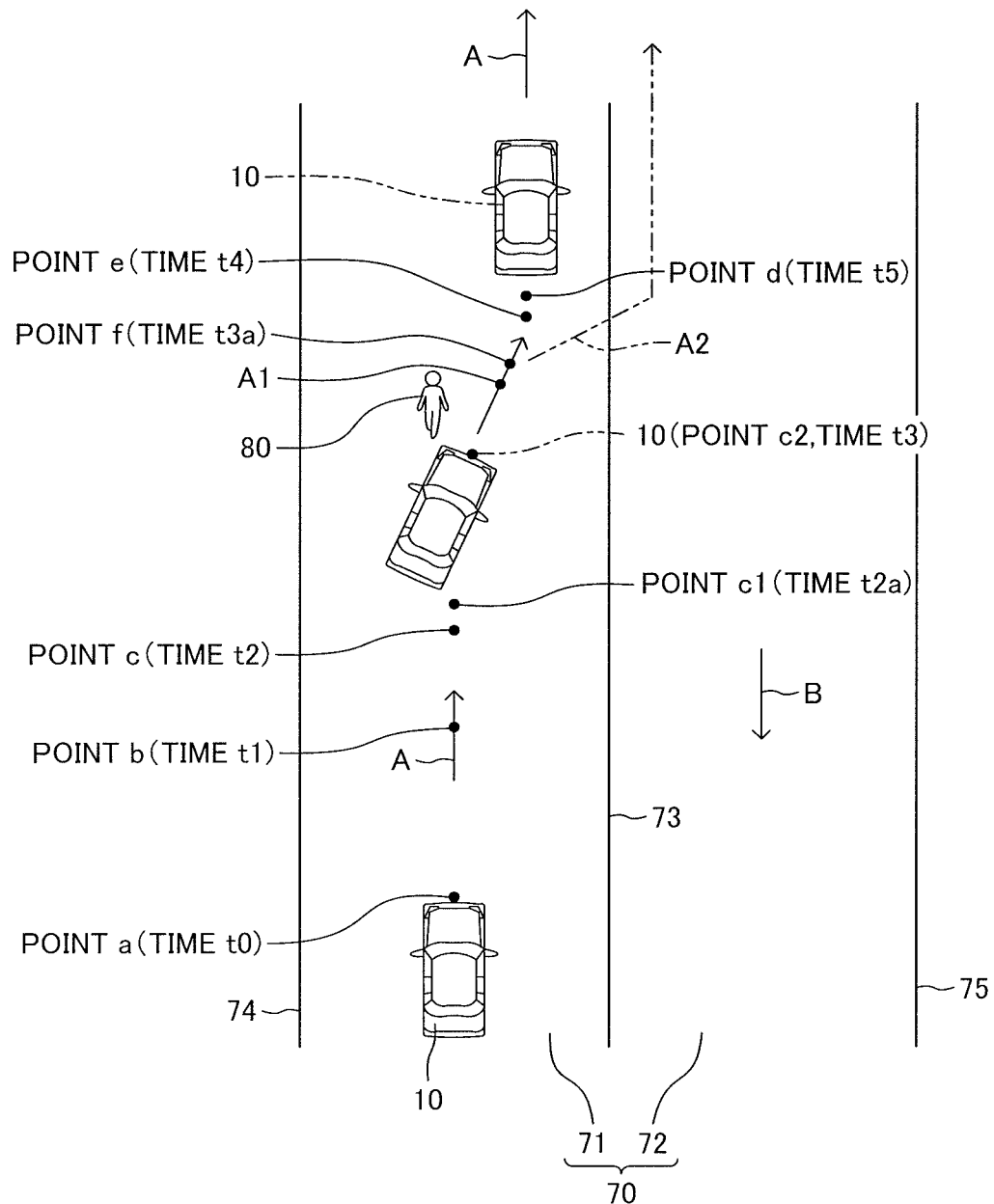
FIG. 4 is a plan view for illustrating how the vehicle travels on a road on which a pedestrian stands.

Next, a case where the vehicle 10 travels on a road 70 illustrated in FIG. 4 is described.

The road 70 is a road having one lane on each side. Specifically, the road 70 includes a travel lane 71 and a travel lane 72. The vehicle 10 travels on the travel lane 71 in a direction of an arrow A, which is parallel to an extending direction of the road 70. Meanwhile, a vehicle (not shown) different from the vehicle 10 travels on the travel lane 72 in a direction of an arrow B. A white line 73 (median separation line) for separating the travel lane 71 and the travel lane 72 from each other is drawn between those travel lanes. A white line 74 is drawn on a side end of the travel lane 71 opposite to the white line 73, whereas a white line 75 is drawn on a side end of the travel lane 72 opposite to the white line 73. The white lines 73, 74, and 75 are parallel to one another.

A pedestrian 80 is positioned on the travel lane 71.

When the front end of the vehicle 10 reaches a point a, the collision determination unit 35 determines that "the predicted time to collision TTC is equal to or shorter than the first collision determination threshold time TTCth1". In other words, the collision determination unit 35 determines that "the vehicle 10 is highly likely to collide with the pedestrian 80".

Figure 5:
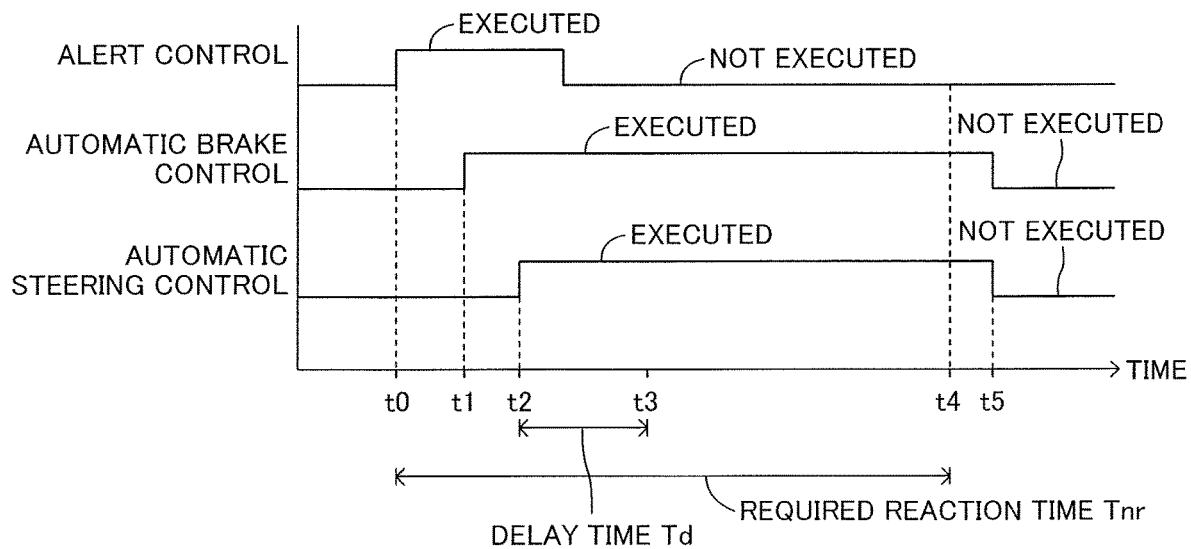
FIG. 5 is a timing chart for illustrating operation timings of alert control, automatic brake control, and automatic steering control.

Then, the alert ECU 60 follows the operation signal from the support ECU 30 to cause the buzzer 20 to beep and cause the display 21 to display an operation state of the collision avoidance support control. As illustrated in FIG. 4 and FIG. 5, time at this time is a time t0.

When the front end of the vehicle 10 reaches a point b, the collision determination unit 35 determines that "the predicted time to collision TTC is equal to or shorter than the second collision determination threshold time TTCth2". In other words, the collision determination unit 35 determines that "the vehicle 10 is highly likely to collide with the pedestrian 80".

Then, the brake ECU 40 starts the automatic brake control. As illustrated in FIG. 4 and FIG. 5, time at this time is a time t1.

When the front end of the vehicle 10 reaches a point c, the collision determination unit 35 determines that "the travel distance X is larger than the value (L0−β)". In other words, the collision determination unit 35 determines that "the vehicle 10 is highly likely to collide with the pedestrian 80".

Then, the steering ECU 50 starts the automatic steering control. As illustrated in FIG. 4 and FIG. 5, time at this time is a time t2.

However, the electric motor 18 starts rotating when a minute period of time passes after the steering ECU 50 transmits an operation signal to the electric motor 18. Further, there is "play" in the speed reduction mechanism linked to the electric motor 18. Accordingly, when the front end of the vehicle 10 is positioned on the point c side with respect to a point c2, the steering angles of the front wheels 16FW and the rear wheels 16RW do not change. Specifically, the steering angles of the front wheels 16FW and the rear wheels 16RW actually start to change when the front end of the vehicle 10 reaches the point c2. In other words, the steering angles of the front wheels 16FW and the rear wheels 16RW start to change at a time t3 at which a predetermined delay time Td passes since the start time (time t2) of the automatic steering control by the steering ECU 50. Then, at the time t3, the vehicle 10 changes the traveling direction to a direction of an arrow A1, which is aligned with the selected avoidance path, to thereby avoid collision with the pedestrian 80.

The delay time Td is a value specific to the vehicle 10, and is, for example, from 0.1 second to 0.5 second. The delay time Td is recorded in a memory of the steering ECU 50.

A required reaction time Tnr is added to the time t0 to obtain a time t4, and at the time t4, the front end of the vehicle 10 reaches a point e.

As described above, the required reaction time Tnr is a period of time (e.g., 3.0 seconds) required until a driver having an average driving capability starts an appropriate driving operation (i.e., a driving operation required for avoiding collision with the pedestrian 80) after recognizing the start of beeping of the buzzer 20. The required reaction time Tnr is recorded in the memory of the steering ECU 50.

Further, the time t4 is an appropriate driving operation enabled time.

For example, when the front end of the vehicle 10 reaches a point d at a time t5, which comes after the time t4, in a case where the collision determination unit 35 determines that "the control termination condition is satisfied" because the vehicle speed of the vehicle 10 becomes zero, as illustrated in FIG. 5, the steering ECU 50 immediately terminates the automatic steering control and the brake ECU 40 immediately terminates the automatic brake control at the time t5.

The required reaction time Tnr terminates before the front end of the vehicle 10 reaches the point d.

Accordingly, as long as the steering ECU 50 continues the automatic steering control and the brake ECU 40 continues the automatic brake control until the required reaction time Tnr terminates (i.e., until the time t4), even when the steering ECU 50 terminates the automatic steering control and the brake ECU 40 terminates the automatic brake control at the time t5, the driver can execute an appropriate driving operation (e.g., a steering operation and a breaking operation) after the time t5. Specifically, for example, after the time t5, the driver is less likely to inappropriately steer the steering wheel 15 to cause the vehicle 10 to enter the travel lane 72 as a result. In other words, in this case, the driver can appropriately steer the steering wheel 15 to cause the vehicle 10 to travel in the direction of the arrow A again.

Figure 6:
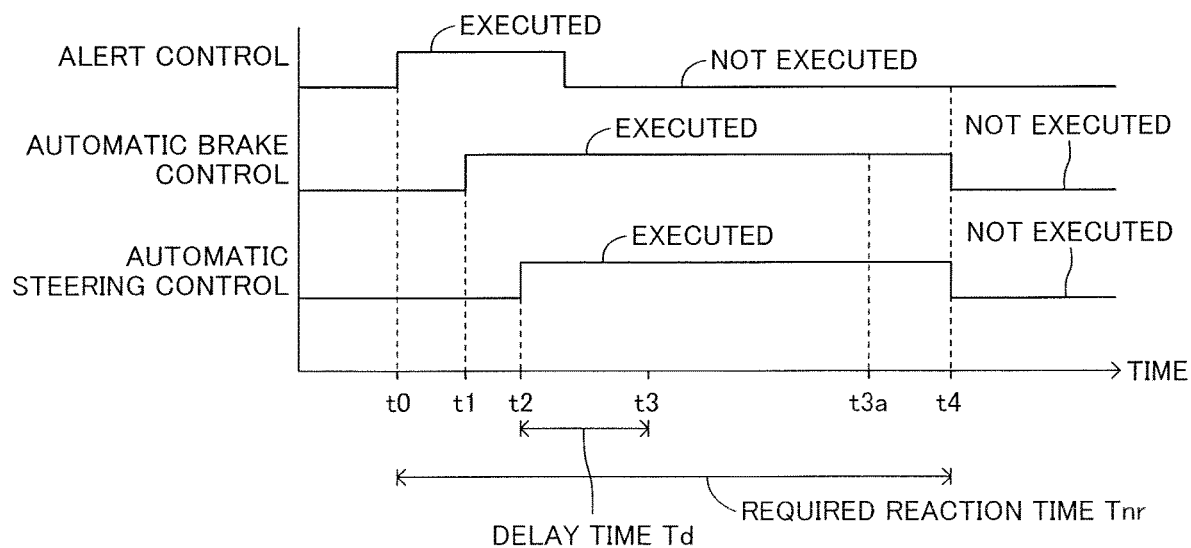
FIG. 6 is a timing chart, which is different from that of FIG. 5, for illustrating operation timings of the alert control, the automatic brake control, and the automatic steering control.

Further, in a case where the collision determination unit 35 determines that "the control termination condition is satisfied" when the front end of the vehicle 10 reaches a point f, which is positioned on the point c side with respect to the point e and positioned on the point e side with respect to the point c2, at a time t3a, which comes after the time t3 and before the time t4, as illustrated in FIG. 6, the automatic steering control and the automatic brake control are continued until the time t4 is reached. Then, when the front end of the vehicle 10 reaches the point e, the steering ECU 50 terminates the automatic steering control and the brake ECU 40 terminates the automatic brake control. In other words, when the required reaction time Tnr terminates, the automatic steering control and the automatic brake control terminate.

Accordingly, the behavior of the vehicle 10 is less likely to become unstable between the time t3 and the termination time (time t4) of the required reaction time Tnr.

Further, the vehicle speed of the vehicle 10 at the time t4 in this case is slower than the vehicle speed of the vehicle 10 at the time t4 when the automatic brake control terminates at the time t3a (assuming that the vehicle 10 travels at the time t4 in any case). In other words, the vehicle speed of the vehicle 10 at the time t4 when the automatic brake control terminates at the time t3a is faster than the vehicle speed of the vehicle 10 at the time t4 when the automatic brake control terminates at the time t4.

Accordingly, in a case where the automatic brake control terminates at the time t3a, for example, when the driver steers the steering wheel 15 in a clockwise direction at the time t4, the vehicle 10 may pass through the white line 73 to enter the travel lane 72 as illustrated in an arrow A2 of the virtual line of FIG. 4.

In contrast, in a case where the automatic brake control is ended at the time t4 as in this embodiment, the vehicle speed of the vehicle 10 becomes sufficiently slower at the time t4. Accordingly, for example, even when the driver steers the steering wheel 15 in the clockwise direction a little more than necessary after the time t4, the vehicle 10 is less likely to pass through the white line 73 to enter the travel lane 72.

Figure 7:
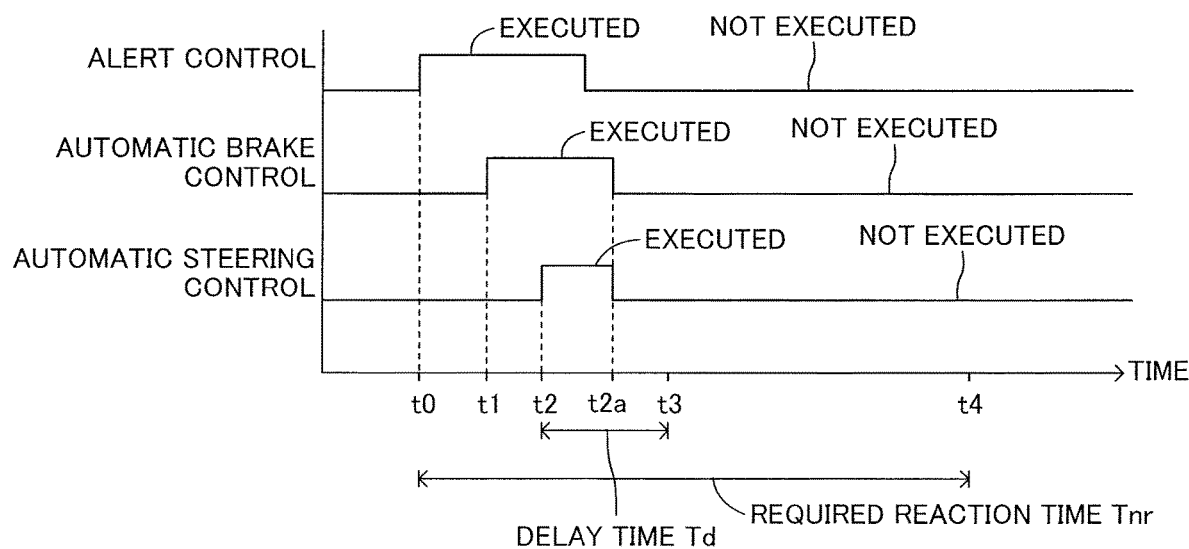
FIG. 7 is a timing chart, which is different from those of FIG. 5 and FIG. 6, for illustrating operation timings of the alert control, the automatic brake control, and the automatic steering control.

Further, for example, in a case where the collision determination unit 35 determines that "the control termination condition is satisfied" when the front end of the vehicle 10 is positioned at a point c1 between the point c and the point c2 at a time t2a, which comes before the time t3 and after the time t2, as illustrated in FIG. 7, the steering ECU 50 immediately terminates the automatic steering control and the brake ECU 40 immediately terminates the automatic brake control. In other words, when the collision determination unit 35 determines that "the control termination condition is satisfied" before the traveling direction of the vehicle 10 is changed by the automatic steering control by the steering ECU 50 independently of the driver's intention, the steering ECU 50 immediately terminates the automatic steering control and the brake ECU 40 immediately terminates the automatic brake control.

In this case, the traveling direction of the vehicle 10 is not changed by the automatic steering control independently of the driver's intention, and hence the driver can execute an appropriate driving operation immediately after the automatic steering control and the automatic brake control terminate.

Next, referring to flowcharts of FIG. 8 to FIG. 13, specific processing performed by the support ECU 30, the brake ECU 40, the steering ECU 50, and the alert ECU 60 is described.

Figure 8:
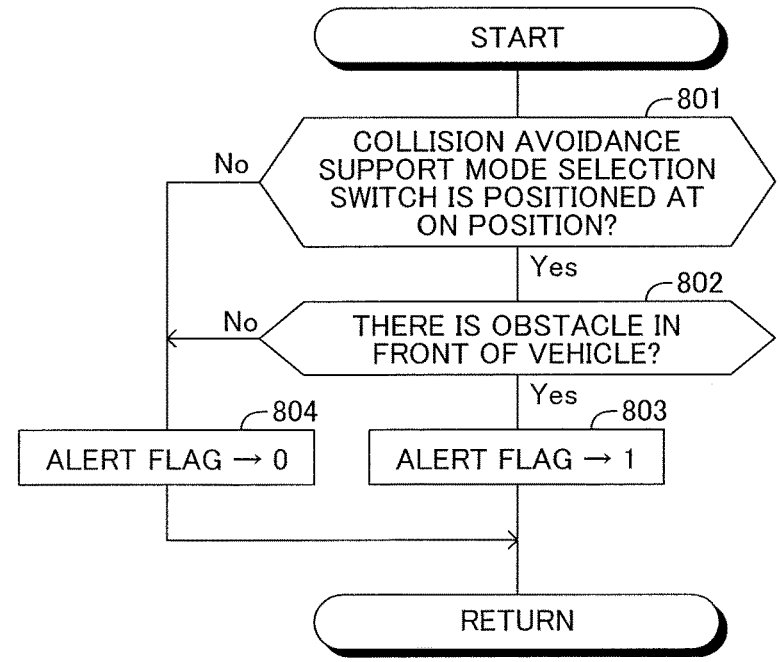
FIG. 8 is a flowchart for illustrating processing to be executed by a support ECU.

When a position of an ignition switch (not shown) of the vehicle 10 is switched from an off position to an on position through an operation of the ignition switch (not shown), the support ECU 30 repeatedly executes a routine illustrated in the flowchart of FIG. 8 every time a predetermined period of time passes.

First, in Step 801, the support ECU 30 determines whether or not the collision avoidance support mode selection switch is positioned at the on position.

When determining "Yes" in Step 801, the support ECU 30 proceeds to Step 802, and the obstacle determination unit 34 determines whether or not there is an obstacle in front of the vehicle 10.

When determining "Yes" in Step 802, the support ECU 30 proceeds to Step 803, and the collision determination unit 35 sets an alert flag to "1".

An initial value of the alert flag is "0".

When determining "No" in Step 801 or 802, the support ECU 30 proceeds to Step 804, and the collision determination unit 35 sets the alert flag to "0".

When finishing the processing of Step 803 or 804, the support ECU 30 temporarily terminates the processing of this routine.

Figure 9:
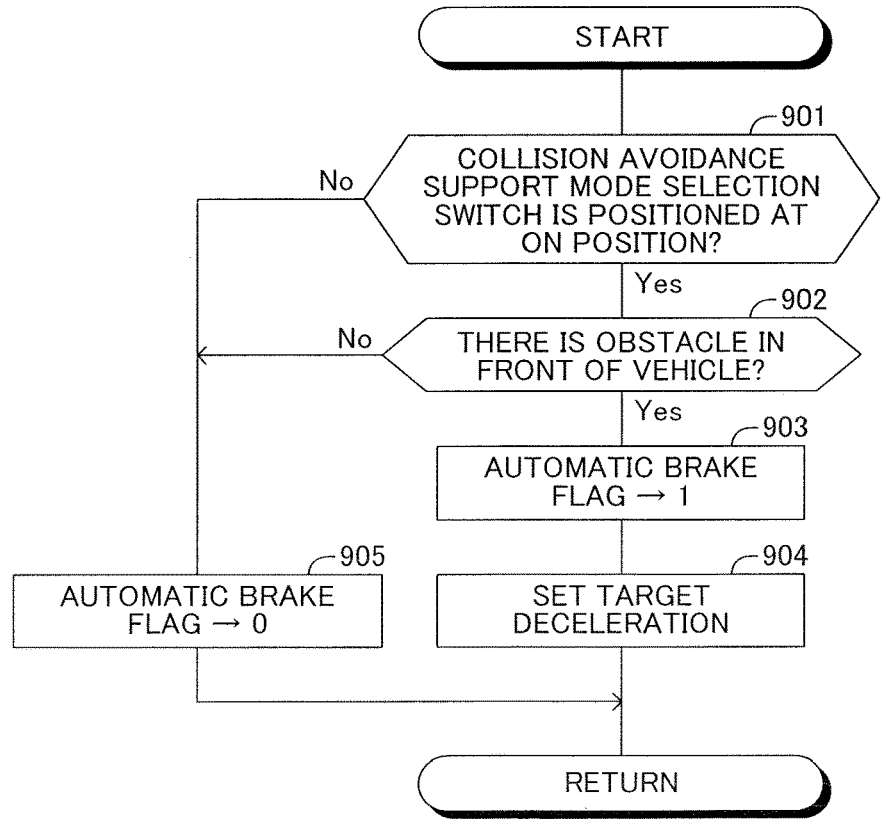
FIG. 9 is a flowchart for illustrating processing to be executed by the support ECU.

When the position of the ignition switch is switched from the off position to the on position, the support ECU 30 repeatedly executes a routine illustrated in the flowchart of FIG. 9 every time a predetermined period of time passes.

Each of the processing of Steps 901 and 902 is the same as the processing of Steps 801 and 802, respectively.

When determining "Yes" in Step 902, the support ECU 30 proceeds to Step 903, and the collision determination unit 35 sets an automatic brake flag to "1". An initial value of the automatic brake flag is "0".

When finishing the processing of Step 903, the support ECU 30 proceeds to Step 904, and the target deceleration calculation unit 36 sets the target deceleration.

When determining "No" in Step 901 or 902, the support ECU 30 proceeds to Step 905, and the collision determination unit 35 sets the automatic brake flag to "0".

When finishing the processing of Step 904 or 905, the support ECU 30 temporarily terminates the processing of this routine.

Figure 10:
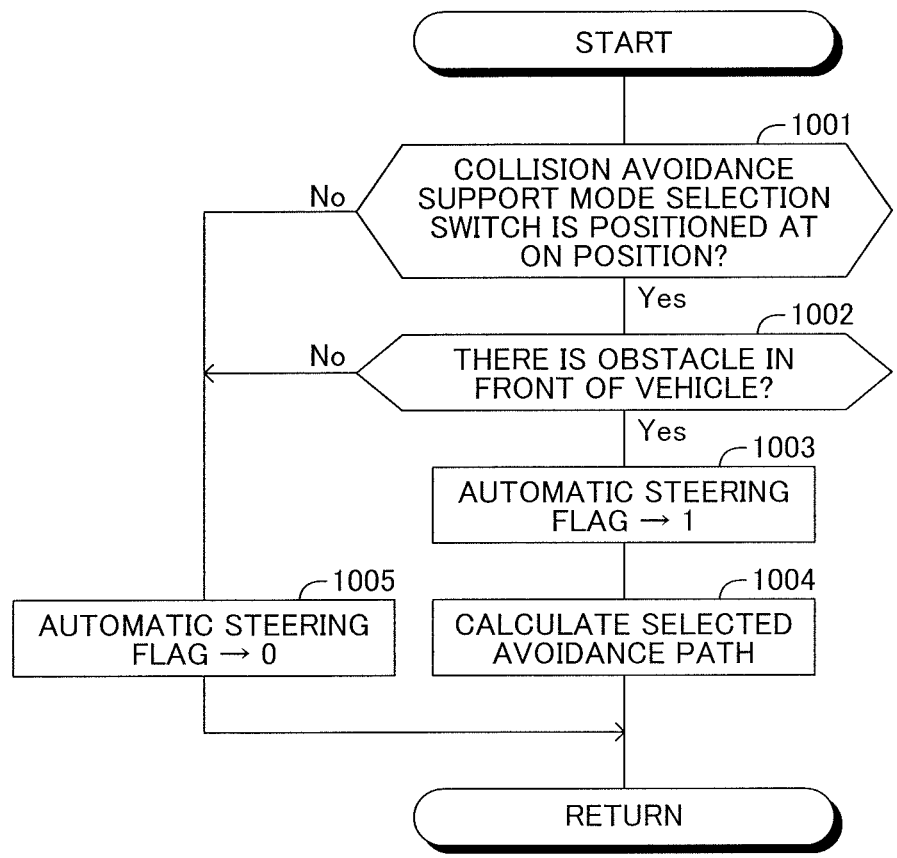
FIG. 10 is a flowchart for illustrating processing to be executed by the support ECU.

When the position of the ignition switch is switched from the off position to the on position, the support ECU 30 repeatedly executes a routine illustrated in the flowchart of FIG. 10 every time a predetermined period of time passes.

Each of the processing of Steps 1001 and 1002 is the same as the processing of Steps 801 and 802, respectively.

When determining "Yes" in Step 1002, the support ECU 30 proceeds to Step 1003, and the collision determination unit 35 sets an automatic steering flag to "1". An initial value of the automatic steering flag is "0".

When finishing the processing of Step 1003, the support ECU 30 proceeds to Step 1004, and the avoidance target track calculation unit 37 calculates (identifies) the selected avoidance path.

When determining "No" in Step 1001 or 1002, the support ECU 30 proceeds to Step 1005, and the collision determination unit 35 sets the automatic steering flag to "0".

When finishing the processing of Step 1004 or 1005, the support ECU 30 temporarily terminates the processing of this routine.

Figure 11:
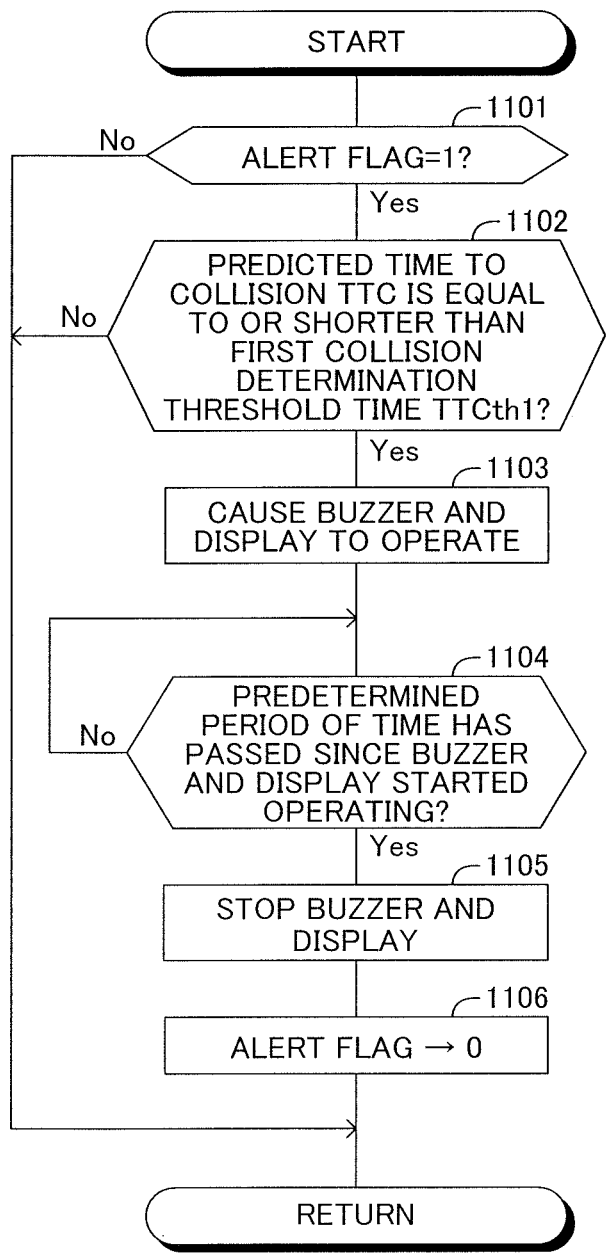
FIG. 11 is a flowchart for illustrating processing to be executed by the support ECU.

When the position of the ignition switch is switched from the off position to the on position, the support ECU 30 repeatedly executes a routine illustrated in the flowchart of FIG. 11 every time a predetermined period of time passes.

In Step 1101, the support ECU 30 determines whether or not the alert flag is "1".

When determining "Yes" in Step 1101, the support ECU 30 proceeds to Step 1102, and the collision determination unit 35 determines whether or not the predicted time to collision TTC is equal to or shorter than the first collision determination threshold time TTCth1.

When determining "Yes" in Step 1102, the support ECU 30 proceeds to Step 1103 to transmit the operation signal to the alert ECU 60. Then, the alert ECU 60 causes the buzzer 20 and the display 21 to operate.

When finishing the processing of Step 1103, the support ECU 30 proceeds to Step 1104 to determine whether or not a predetermined period of time has passed since the buzzer 20 and the display 21 started operating.

When determining "No" in Step 1104, the support ECU 30 repeats the processing of Step 1104.

Meanwhile, when determining "Yes" in Step 1104, the support ECU 30 proceeds to Step 1105 to transmit a stop signal to the alert ECU 60. Then, the alert ECU 60 stops the buzzer 20 and the display 21.

When finishing the processing of Step 1105, the support ECU 30 proceeds to Step 1106, and the collision determination unit 35 sets the alert flag to "0".

When the support ECU 30 determines "No" in Step 1101 or 1102, the support ECU 30 temporarily terminates the processing of this routine.

Figure 12:
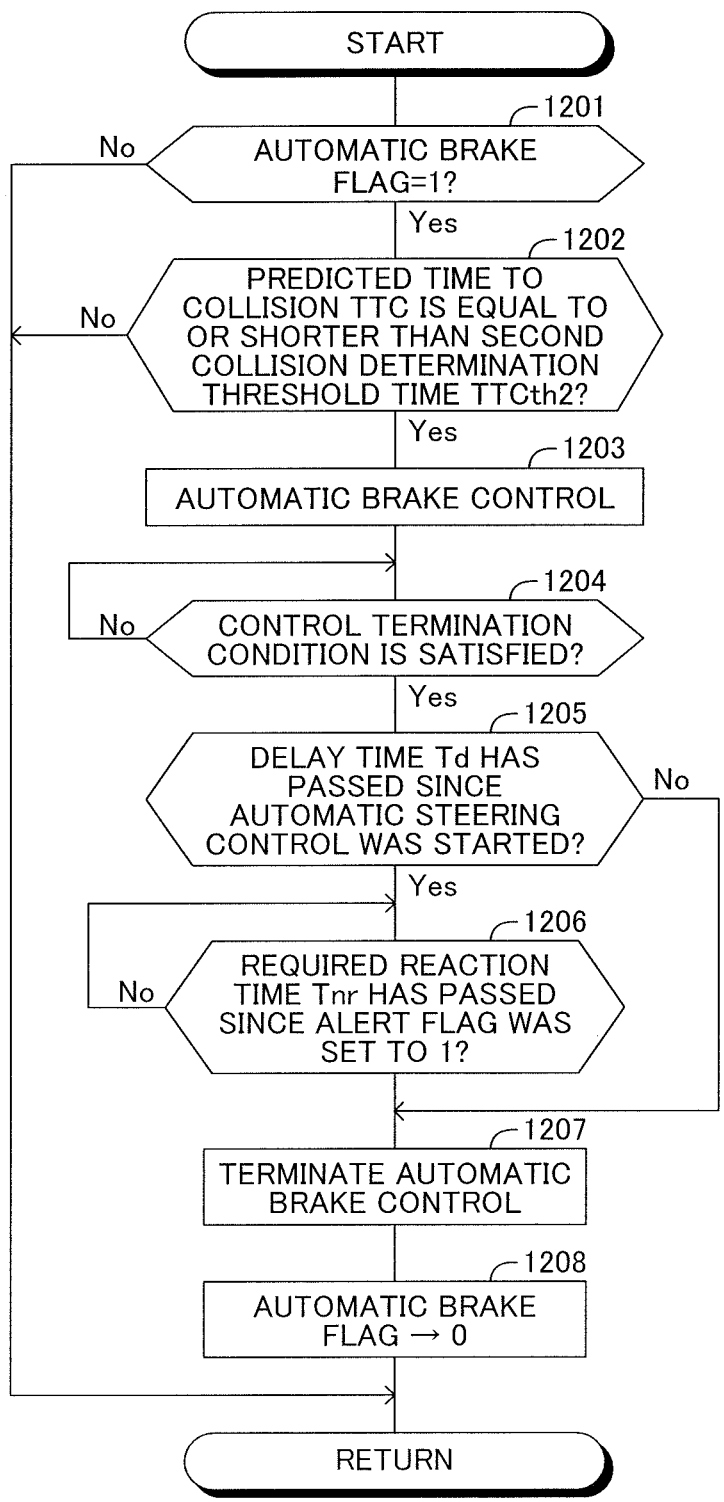
FIG. 12 is a flowchart for illustrating processing to be executed by the support ECU.

When the position of the ignition switch is switched from the off position to the on position, the support ECU 30 repeatedly executes a routine illustrated in the flowchart of FIG. 12 every time a predetermined period of time passes.

In Step 1201, the support ECU 30 determines whether or not the automatic brake flag is "1".

When determining "Yes" in Step 1201, the support ECU 30 proceeds to Step 1202, and the collision determination unit 35 determines whether or not the predicted time to collision TTC is equal to or shorter than the second collision determination threshold time TTCth2.

When determining "Yes" in Step 1202, the support ECU 30 proceeds to Step 1203 to transmit the operation signal to the brake ECU 40. Then, the brake ECU 40 starts the automatic brake control while using the target deceleration calculated in Step 904.

When finishing the processing of Step 1203, the support ECU 30 proceeds to Step 1204, and the collision determination unit 35 determines whether or not the control termination condition is satisfied.

When determining "No" in Step 1204, the support ECU 30 repeats the processing of Step 1204.

Meanwhile, when determining "Yes" in Step 1204, the support ECU 30 proceeds to Step 1205, and the collision determination unit 35 determines whether or not the delay time Td has passed since the automatic steering control was started.

When the automatic steering control is not started yet at the current time, the support ECU 30 determines "No" in Step 1205.

When determining "Yes" in Step 1205, the support ECU 30 proceeds to Step 1206, and the collision determination unit 35 determines whether or not the required reaction time Tnr has passed.

When determining "No" in Step 1206, the support ECU 30 repeats the processing of Step 1206.

Meanwhile, when the collision determination unit 35 determines "No" in Step 1205, or determines "Yes" in Step 1206, the brake ECU 40 needs to immediately terminate the automatic brake control.

Accordingly, in this case, the support ECU 30 proceeds to Step 1207, and the control unit 38 transmits a stop signal to the brake ECU 40.

When finishing the processing of Step 1207, the support ECU 30 proceeds to Step 1208, and the collision determination unit 35 sets the automatic brake flag to "0".

When the support ECU 30 determines "No" in Step 1201 or 1202, or finishes the processing of Step 1208, the support ECU 30 temporarily terminates the processing of this routine.

Figure 13:
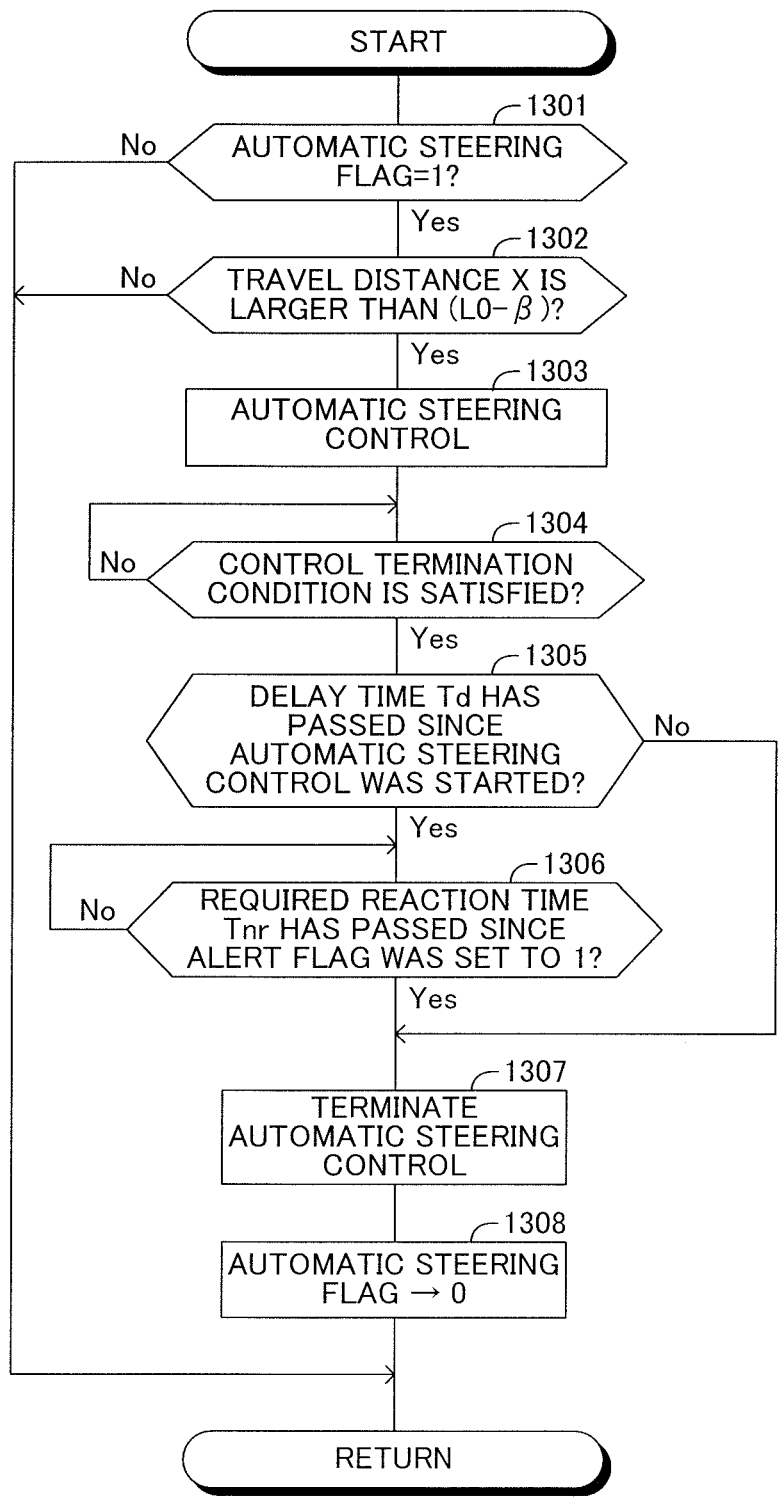
FIG. 13 is a flowchart for illustrating processing to be executed by the support ECU.

When the position of the ignition switch is switched from the off position to the on position, the support ECU 30 repeatedly executes a routine illustrated in the flowchart of FIG. 13 every time a predetermined period of time passes.

In Step 1301, the support ECU 30 determines whether or not the automatic steering flag is "1".

When determining "Yes" in Step 1301, the support ECU 30 proceeds to Step 1302 to determine whether or not the travel distance X is larger than the value (L0−β).

When determining "Yes" in Step 1302, the support ECU 30 proceeds to Step 1303 to transmit the operation signal to the steering ECU 50. Then, the steering ECU 50 causes the electric motor 18 to operate so that the vehicle 10 travels along the selected avoidance path calculated in Step 1004. In other words, the steering ECU 50 starts the automatic steering control.

Details of control in Steps 1304, 1305, and 1306 are the same as those in Steps 1204, 1205, and 1206, respectively.

When determining "Yes" in Step 1306, the support ECU 30 proceeds to Step 1307, and the control unit 38 transmits a stop signal to the steering ECU 50.

When finishing the processing of Step 1307, the support ECU 30 proceeds to Step 1308, and the collision determination unit 35 sets the automatic steering flag to "0".

When the support ECU 30 determines "No" in Step 1301 or 1302, or finishes the processing of Step 1308, the support ECU 30 temporarily terminates the processing of this routine.

In the above, the collision avoidance support device according to this embodiment has been described, but the present invention is not limited to the above-mentioned embodiment, and various changes are possible within the range not departing from the object of the present invention.

For example, the brake ECU 40 may be configured to execute "left and right brake balance adjustment control" corresponding to the automatic steering control.

The "left and right brake balance adjustment control" is known control in which magnitudes of the braking forces applied from the friction brake mechanisms 22 to the left front and rear wheels 16FW and 16RW and magnitudes of the braking forces applied from the friction brake mechanisms 22 to the right front and rear wheels 16FW and 16RW are made different from each other, to thereby adjust the traveling direction of the vehicle 10.

The automatic steering control and the left and right brake balance adjustment control are both an example of traveling direction automatic control.

When the driver operates the steering wheel 15 for rotation under a state in which the traveling direction automatic control is being executed, the steering ECU 50 (or the brake ECU 40) may immediately terminate the traveling direction automatic control and execute steering control (or the left and right brake balance adjustment control) corresponding to the driver's steering operation.

The termination time of the automatic brake control and the termination time of the traveling direction automatic control may be made different from each other.

Instead of recording the delay time Td in the memory of the steering ECU 50, for example, based on output from a sensor configured to detect a rotation angle of the electric motor 18, the collision determination unit 35 may detect that the delay time Td has ended.

The surroundings sensor 28 does not need to include the radar sensor 29*a* and the camera 29*b*. For example, the radar sensor 29*a* and a monocular camera may be used to form the surroundings sensor 28.

Information of a navigation system may be used as information representing the shape of the road (travel lane) on which the vehicle 10 travels and the positional relationship between the road and the vehicle 10.

Alert means may include only one of the buzzer 20 and the display 21.

What is claimed is:

1. A collision avoidance support device, comprising:
   one or more sensors configured to detect an obstacle existing in front of a vehicle;
   an alert processor programmed to issue an alert to a driver of said vehicle when a likelihood condition that said vehicle will collide with said obstacle is met;
   an automatic brake control processor programmed to execute automatic brake control of applying braking forces to wheels of said vehicle when said likelihood condition is met under a state in which said alert processor is issuing said alert; and
   a traveling direction automatic control processor programmed to execute traveling direction automatic control of changing a traveling direction of said vehicle so that said vehicle avoids collision with said obstacle when said likelihood condition is met under a state in which said automatic brake control processor means is executing said automatic brake control,
   said traveling direction automatic control processor being programmed to:
   in response to a predetermined control termination condition being satisfied at a time before an operation start time at which said vehicle starts changing said traveling direction by said traveling direction automatic control, automatically terminate said traveling direction automatic control;
   in response to said predetermined control termination condition being satisfied at a time after said operation start time and before an appropriate driving operation enabled time at which a predetermined required reaction time passes since a time at which said alert processor starts issuing said alert, automatically continue said traveling direction automatic control until said appropriate driving operation enabled time; and
   in response to said predetermined control termination condition being satisfied after said appropriate driving operation enabled time, automatically terminate said traveling direction automatic control.

2. The collision avoidance support device according to claim 1, wherein said traveling direction automatic control processor executes automatic steering control of adjusting steering angles of steered wheels, which are a part of said wheels.

3. The collision avoidance support device according to claim 1, wherein said likelihood condition is met when: a predicted time to collision between said vehicle and said obstacle is equal to or shorter than a predetermined collision determination threshold time, or a travel distance until said vehicle stops is larger than a distance value, wherein the travel distance is determined based on a current deceleration amount and a current vehicle speed, and wherein the distance value is obtained by subtracting a constant value from a current distance between said vehicle and said obstacle.

* * * * *